United States Patent [19]

Bossert et al.

[11] 4,140,649

[45] Feb. 20, 1979

[54] METHOD AND COMPOSITION FOR CLEANING THE SURFACES OF FOODS AND FODDER

[76] Inventors: Eduard Bossert, Lindenstrasse 22, 7803 Gundelfingen; Marlies Aumann nee Meyer, Freiherr-vom-Stein Strasse 6, 5423 Braubach, both of Fed. Rep. of Germany

[21] Appl. No.: 807,181

[22] Filed: Jun. 16, 1977

Related U.S. Application Data

[63] Continuation-in-part of Ser. No. 726,920, Sep. 27, 1976, abandoned.

[30] Foreign Application Priority Data

Mar. 5, 1977 [DE] Fed. Rep. of Germany ....... 2709750

[51] Int. Cl.$^2$ ................................................ C11D 7/60
[52] U.S. Cl. ..................................... 252/105; 426/271; 426/286; 426/310; 426/335; 426/532; 134/28; 134/29; 134/40
[58] Field of Search ................ 252/105; 426/271, 286, 426/310, 335, 532; 134/28, 29, 40

[56] References Cited

U.S. PATENT DOCUMENTS

| | | | |
|---|---|---|---|
| 3,503,885 | 3/1970 | Wedell | 252/105 |
| 3,814,820 | 6/1974 | Busta et al. | 426/262 |
| 3,987,208 | 10/1976 | Rahman et al. | 426/335 X |
| 4,042,716 | 8/1977 | Bertram et al. | 426/335 |

*Primary Examiner*—Mayer Weinblatt
*Attorney, Agent, or Firm*—Irvin A. Lavine

[57] ABSTRACT

The invention relates to a method for cleaning the surfaces of foods and fodder of plant and animal origin by manual or mechanical washing in water, the surfaces of said foods or fodder having adhering thereto contaminants and/or physiologically and toxicologically noxious substances, such as hydrophobic and hydrophilic pesticides, inorganic noxious elements, oily condensates of noxious substances, as well as other contaminants, and to certain agents and compositions which are added to the wash water; food and fodder refreshing is achieved.

26 Claims, No Drawings

METHOD AND COMPOSITION FOR CLEANING THE SURFACES OF FOODS AND FODDER

This is a continuation-in-part of Ser. No. 726,920, filed Sept. 27, 1976, now abandoned.

BACKGROUND OF THE DISCLOSURE

The surfaces of food and fodder of both plant and animal origin which are generally available are for the most part more or less seriously contaminated with both physiologically and toxicologically active noxious substances. These substances reach the food in the form of pesticides, fertilizers, preservatives, etc. Further, dirt and other noxious substances unavoidably reach the food and fodder, for example in the form of industrial emissions, fuel residues, oil fumes, and road dust, etc.

Although manual or mechanical washing or scrubbing procedure involving flowing or stagnant, cold or hot water can per se remove a portion of some of the noxious substances adhering to the surface, firmly attached contaminants and the noxious substances are either incompletely removed or not at all.

The most prominent of these noxious substances which are not removed by conventional cleaning are as follows:
1. Polar pesticides
2. Nonpolar pesticides
3. Substituted and unsubstituted hydrocarbons
4. Additives
5. Heavy metals in inorganic form (oxides, carbonates, silicates, soluble salts).
6. General contamination, including insoluble dusts and fibers.
7. Microorganisms.

The environmental contamination of foodstuffs depends in a completely uncontrollable manner on the condition of exposure such as weather and location, on the chemical and physical particularities of the conteminating agents and on the surface characteristics of the foodstuffs.

Further, there is the sequence of sedimentation on the surfaces of the foodstuffs exposed from the time of vegetation until the processing for kitchen and commercial use. By sequence of sedimentation is to be understood the formation of layers on the surface of foodstuffs during these periods of exposure to different elements.

SUMMARY OF THE INVENTION

The method is intended to be simple and low-cost, so that it is suitable for home and commercial food preparation and can even be used when camping and on trips. Another object of the invention is to provide agents and compositions with which thorough cleaning of foods and fodders may be accomplished.

The object of the invention is to overcome the difficulty and nuisance in the washing and freshening of the surfaces of foods and fodder, especially cleaning the surfaces of foods and fodder of vegetable and animal origin intended to be eaten raw, for preparation in the kitchen, or for commercial processing, said surfaces having been contaminated with e.g., physiological and toxicological pollutants, especially hydrophobic and hydrophilic biocides, inorganic pollutants, oily condensates of noxious matter and inert contaminants, by providing a method and composition serving to remove even the most stubborn adhering contaminants and pollutants, said compositions or agents being usable in manually or mechanially agitated aqueous washing solutions. The agents are simple to use, so that they are suitable for use in the home, in food processing as well as on camping and other trips.

This object can be accomplished in a method according to the invention by adding to the wash water a composition of matter and active ingredients, said composition comprising one or more of the following substances:
Anionic surfactants,
Nonionic surfactants,
Sequestering agents,
Buffers,
Reductones,
Disinfectants,
Stabilizers and processing additives.

Further the invention also provides agents and compositions for cleaning the surfaces of foods and fodder of plant and animal origin, said agents or compositions being added to the wash water.

DESCRIPTION OF THE PREFERRED EMBODIMENTS

It is generally known that cleaning agents have a stronger effect at higher temperature in the cleaning bath. However, in view of individual types of perishable foods, cleaning at low temperatures, or lukewarm temperature is preferred.

The objects described above are achieved with agents of compositions of the type described hereinbelow, wherein at least one substance from each of the groups below is included.

a. 1 to 10% by weight anionic tensides, selected from the group consisting of sulfates, ether sulfates, sulfonates, sulfoacetates, sulfosuccinates, sarcosinates, and protein condensation products. Olefin sulfonates and lauryl sulfate are particularly suitable because they are nearly tasteless. In particular, the solubilizing effect of anionic tensides and the wetting effect of nonionic tensides favor the objects of the invention.

b. 0.1 to 4% by weight nonionic tensides, such as polyoxyethylene adducts.

Additives of nonionic surfactants serve primarily to improve cold wettability and solubilization. When combined with anionic active ingredients, there is a pronounced improvement in the cleaning power when cold. A low critical micelle formation concentration produces a good solubilization with small amounts of additive. Polyoxyethylene-sorbitan-fatty acid esters in the deodorized processing form are particularly valuable. In addition, partial glycerin fatty-acid esters, especially citric acid fatty-acid glyceride are especially suitable; these have the advantage of being completely harmless.

c. 1 to 25% by weight sequestering agent.

Complexing of noxious elements is of great importance for the method according to the invention. Particularly advantageous is ethylene dinitrilotetraacetic acid as well as salts, since it is physiologically relatively harmless. Its metal compexes retain sufficient stability even in slightly acid solutions to dissolve metal oxides and other compounds, for example of mercury, tin, nickel, cobalt, and zinc, and to keep them in solution. In addition, the stability of ascorbic acid, still to be discussed, is increased by masking of iron and copper.

Other suitable sequestering agents include hydroxycarboxylic acids such as tartaric acid, citric acid, and luconic acid, as well as D-sorbitol and mannitol.

d. 1 to 4% by weight of substances controlling the redox state;
e. 50 to 30% by weight buffers.

Buffers:

The wash water advantageously should have a pH value between 5 and 8, especially about 6. This may be achieved by adding hydroxycarboxylic acids or their alkali salts.

f. 0.1 to 0.5% by weight preservatives;
g. balance up to 100% by weight composed of stabilizers, processing additives, extenders and diluents.
h. Reductones:

It is advantageous to have a reducing aqueous medium in order to protect the food for a short period of time against oxidative effects during cleaning, since it affects subsequent preparation. The color of the food is remarkably freshened thereby, and in the case of slightly damaged vegetables, discoloration by chemical and enzymatic oxidation is retarded. The appearance and aroma are preciptibly improved. Free chlorine in the wash water, which is very harmful to aroma even when present in trace amounts, is reduced to harmless chloride.

For example, ascorbic acid and ascorbates as well as sulfurous acids and their salts are suitable as reductones for surface treatment of foods.

i. Disinfectants

It is not feasible to completely disinfect the surface of food because of the nature thereof. However, it is possible to have a nonspecific scouring of microorganisms under the influence of washing active substances, even in the case of massive contamination. Thus, there is possible to obtain a decrease up to 95% in the total bacterial count on the surface of the food.

Depending on the composition employed, the addition of a preservative may be necessary.

Tartaric acid and lactic acid, slightly disinfectant compounds, can be added without objection. In addition, small amounts of other known food disinfectants and preservatives may be employed in non-toxic amounts.

In addition, the processing agents may contain additional components such as stabilizers, processing additives and inert fillers and diluents. Since the solutions prepared with the agent are hypotonic with respect to cell saps, there is no danger of diffusion into the interior of the food. Owing to the relatively short processing time, mineral and organic valuable components to the food will not be leached out. It should be mentioned in this connection that the agent according to the invention is not intended to accomplish vitaminization or modification of the content of mineral salts or trace elements. By adding cold-water soluble plant and algal gums, celluose derivatives, sugar alcohols, and other water-soluble colloids, this material exchange can be further inhibited. These components also have synergistic effects as dispersion stabilizers, protective colloids, anti-deposition agents, and thickeners, used alone or in combination with other components.

The processing agent can be provided in dry form as powder, granules, tablets, or pieces, in a dissolved form as paste or gel, or as an aqueous concentrate. Anhydrous preparations can be stabilized by adding colloidal silicic acid (e.g., Aerosil 200). Potassium chloride and sodium chloride can be included for example as solid diluents.

Packaging of the agents according to the invention should receive the necessary care to keep out oxygen and prevent ultraviolet radiation from reaching the agents. Since the surfaces of foods are more or less pitted and frequently have a naturally soft consistency, the selection of the agents and compositions herein described are of particular value.

The compositions employed can be in the form of powder, granulated substances, pastes, gels, liquids, tablets, pieces or the like. As a result, multiple applications are possible.

Because of their harmless and general applicability these agents and compositions can be used in any form and without any particular instructions.

Cleaning according to the invention is particularly advantageous in the preparation of foods for freezing.

The agents and compositions according to the invention afford striking improvements in the appearance and consistency of intact, as well as aged and damaged foods in contrast to that achieved in the treatment with water alone. Discoloration during subsequent processing and loss of aroma are minimal. Lettuce, for example which is particularly sensitive, was consistently referred to as tasting better.

The agent was used on both ordinary and exotic vegetables, provided they were left in their natural state and not cut up, including leafy and stalk vegetables, root and bulb vegetables, legumes, cucumbers and squash, pomaceous and stone fruits, small fruit, wild fruit, and mushrooms.

Foods of animal origin were likewise treated successfully. For example, meats and sausages, whole cheese and fish can be cleaned, where necessary.

The agent according to the invention is particularly advantageous for cleaning dried fruits, which undergo a freshening effect hitherto never achieved. Forest mushrooms lose their slime and stickiness; mushroom mycelium, pine needles, insects, and their chitinous remains are removed.

Highly sensitive types of fruit and vegetables are cleaned by a mere swishing. Very crinkly types of vegetables (for example lettuce) need no longer be taken apart to be cleaned completely.

According to the functions of the components described above for the individual groups within the overall effect of the processing agent, the following general formulation is recommended for the various possible solid, semi-solid and liquid forms. The ranges given in accordance with the invention, while maintaining an overall composition which is correct for the desired function, should not be understood as strict limits:

EXAMPLE 1

| | |
|---|---|
| Anionic tensides: | 1 to 10% |
| Nonionic tensides: | 0.1 to 4% |
| Ethylenediaminetetraacetic acid, disodium salt: | 1 to 5% |
| Ascorbic acid: | 0.5 to 4% |
| Sodium disulfite: | 0.5 to 2% |
| Citric acid: | 1 to 12% |
| Tripotassium citrate: | 4 to 20% |
| Potassium carbonate: | 0 to 8% |
| Polyalcohols: | 2 to 20% |
| Preservatives: | 0. to 0.5% |
| Inert fillers and additives, including water: | 5 to 90% |

In the following, sample recipes will be given for compositions of the agent according to the invention, which have been found to be particularly suitable. It will be understood that the compositions may also be impregnated in woven or non-woven textile media for introduction into the wash water.

EXAMPLE 2

Powdered agent for manual cleaning in the home: total amount: 1 kg, amount used: 5g/4 liters of washwater.

| I. Ascorbic acid, coated | 20 g |
|---|---|
| Ethylenediaminetetraacetic acid, disodium salt | 20 g |
| Citric acid (powdered anhydrous) | 15 g |
| Sorbit (Merck) | 40 g |
| Aerosil 200 (Degussa) | 3 g |
| II. Lauryl sulfate (100%) | 25 g |
| Sodium disulfite | 9 g |
| Citric acid, trisodium salt dihydrate | 60 g |
| III. Tween 80 (Atlas-Chemie) | 5 g |
| Sorbit | 80 g |
| Aerosil 200 (Degussa) | 3 g |
| IV. Potassium chloride | 720 g |

Mixtures I, II and III are carefully mixed with IV.

When using this example, final rinsing with fresh water is recommended; however, this can be omitted.

EXAMPLE 3

Powdered agent for manual and machine processing.

| I. Ascorbic acid, coated | 40 g |
|---|---|
| Ethylenediaminetetraacetic acid, disodium salt | 30 g |
| Citric acid | 20 g |
| Sorbit | 40 g |
| Aerosil 200 (Degussa) | 3 g |
| II. Lauryl sulfate (calc. 100%) | 50 g |
| Sodium disulfite | 5 g |
| Citric acid, trisodium salt dihydrate | 100 g |
| III. Tween 80 (Atlas-Chemie) | 10 g |
| Sorbit | 100 g |
| Aerosil 200 (Degussa) | 4 g |
| IV. Potassium chloride | 600 g |

*Mixed and used as in Example 2 above.

When using this example, final rinsing with fresh water is recommended.

EXAMPLE 4

Powdered agent for travel and camping.

| I. Calcium ascorbate | 10 g |
|---|---|
| Citric acid | 50 g |
| Mannitol | 50 g |
| Aerosil 200 (Degussa) | 3 g |
| II. Olefin sulfonate sodium salt (100%) | 40 g |
| Sodium disulfite | 15 g |
| Citric acid trisodium salt dihydrate | 200 g |
| III. Tween 40 (Atlas Chemie) | 20 g |
| Sorbit | 100 g |
| Aerosil 200 (Degussa) | 4 g |
| IV. Sodium chloride | 508 g |

Mixed and used as in Example 2 above.

When using this example, final rinsing with fresh water is unnecessary.

EXAMPLE 5

Liquid agent for manual and machine washing.

The concentrations given are approximate values, since they depend upon the mechanics, bath ratio, and wash program. The substances listed are dissolved in the sequence given in 1 liter of distilled water which is disinfected or low in germ content.

| Amount used: 20 ml per 4 liters of water | |
|---|---|
| Ethylenediaminetetraacetic acid disodium salt | 15 g |
| Citric acid trisodium salt dihydrate | 40 g |
| Sodium hydrogen carbonate | 4 g |
| Citric acid (anhydrous crystalline) | 10 g |
| Sodium ascorbate | 15 g |
| Sodium sulfite | 5 g |
| Tween 80 (Atlas Chemie) | 8 g |
| Fatty alcohol sulfate (100%) | 20 g |
| Preserving agent | 2 g |

The aqueous solution should be stored in plasticizer-free plastic containers, preventing access of atmospheric oxygen or light.

Rinsing with fresh water is recommended after use.

EXAMPLE 6

Approximate values for washing tablets for catering and camping:

| Total amount: 1 kg for approximately 1.5 lots of tablets, corresponding to 300 tablets of 5 g each | | |
|---|---|---|
| I. | Ascorbic acid (coated) | 50 g |
| | Ethylenediaminetetraacetic acid, disodium salt | 5 g |
| | Citric acid (anhydrous) | 330 g |
| | Sorbit | 10 g |
| | Aerosil 200 (Degussa) | 2 g |
| II. | Potassium hydrogen carbonate | 360 g |
| | Potassium disulfite | 8 g |
| III. | Citric acid fatty acid glyceride (Tego) | 60 g |
| | Tween 80 (deodorized) (Atlas-Chemie) | 12 g |
| | Sorbit | 160 g |
| | Aerosil (Degussa) | 3 g |

Mixtures, I, II and III are each carefully mixed and then combined.

The tablets are formed, using appropriate additives to avoid moisture.

One tablet will suffice for two liters of water; rinsing is not required.

Results obtained are tabulated as follows:

Table I shows the residue of the toxicologically relevant components of the purifying agent conform with the invention according to composition example 5, on savoy cabbage after termination of the purification process. It was of importance here to demonstrate that no substance — or substrate-specific absorption has taken place. The recovered residual concentration originate apparently from the dilution of the purification bath during the rinsing processes.

Table II shows that "Tensides" remove a large part (up to 95%) of micro-organisms through non-specific action. However, a sequence of sedimentation is indicated by which an appreciable removal of the micro-organisms is possible only through the special composition of the purifying agent conforming with the invention according to composition example 5.

Table III shows the purification results obtained for cauliflower.

Table IV demonstrates the removal of sequential sedimentation.

Table V represents the cleaning results on grapes.

The foregoing also is valid for Table VI which gives the results obtained on feed grass.

Table I

Determination of components of the purifying agent according to the composition of Example 5 on savoy cabbage after treatment

| Components | Volume determined in mg/kg | Remarks |
|---|---|---|
| MBAS | 15.0 | |
| BIAS | 0.8 | |

Table I-continued

Determination of components of the purifying agent according to the composition of Example 5 on savoy cabbage after treatment

| Components | Volume determined in mg/kg | Remarks |
|---|---|---|
| EDTA | 6.0 appr. | determination sensitivity +/- 1mg |

Composition of purification bath as above:
MBAS = 10 mg/lit fatty alcohol sulfate
BIAS = 25 mg/lit polyoxyethylene sorbitan fatty acid waters (Tween 80)
EDTA = ethylenediamine tetraacetic acid, disodium salt
Purification conditions: 500 g savoy cabbage, 3 lit. purification bath, washing process at 30° C.for 5 minutes, 2 rinses at 15° C.

Table II

Comparative total germ-number determination on apples by using a "tenside" combination and the agent as in Example 5:

| No. | type of soiling | formulation | total colonies per apple surface Before | After |
|---|---|---|---|---|
| 1 | E. coli suspension left to dry | a) anionic/nonionic "tensid" combination | 450 | 30 |
|  |  | b) agent as per invention | 420 | 25 |
| 2 | as in 1, + Fe(OH)$_3$ layer + model soiling (cf. Tab. III) | a) anionic/nonionic "tensid" combined | 400 | 130 |
|  |  | b) agent as per invention | 430 | 35 |

Methodology: specially developed contact preparation (Agar/bouillon/peptone nutrient)
Purification: as in Tab. I
Concentration: as in Tab. 1

Table III

Comparative tests on cauliflower, with composition of Example 5: (soiled as per model soiling below)

| No. | Formulation | mg iron before treatment | kg subject after treatment | sensory color | Evaluation after kitchen-like preparation |
|---|---|---|---|---|---|
| 1. | anionic/nonionic tensid combined | 11.6 | 2.4 | whitish-grey | discolored |
| 2. | anionic/nonionic tensid combined + Sorbit + pulverized citrate | 11.2 | 0.6 | almost white | slightly discolored |
| 3. | agent as per invention | 11.2 | 0.2 | pure white | pure white |

Purification conditions and concentration date of Tab. I
Composition of model soiling: 1 lit carbon tetrachloride + 4 g ferrous pigment mixture (>15μ, also soot, fat, iron oxides)

TABLE IV

Comparative test on artificially soiled peaches taking into account a differential sequence of sedimentation
E-605 = paranitrophenylthiophosphoric acid ester

| Sedimentation Sequence for Nos. 1–5 and/or 6–10 from outside to inside | No. | Cleaning Agent | mg. residue/kg fruit Before Treating Lead | E 605 | After Treating Lead | E 605 | Fluorescence (Rhodamine B) After Treatment | Sensory Evaluation After Treatment Appearance | Odor |
|---|---|---|---|---|---|---|---|---|---|
| Crude woolfat + soot Rhodamine B Lead Sulfide p-nitrophenylthiophosphoric acid ester (E-605) | 1 | water | 18 | 15 | 17 | 9 | Strong | Grayish | unpleasant |
|  | 2 | anionic tensid | 17 | 15 | 15 | 9 | Weak | Grayish | distinct |
|  | 3 | anionic/non-ionic combined | 17 | 15 | 15 | 8 | Negative | Turbid, Cloudy | no finding |
|  | 4 | As in No. 3 + EDTA | 17 | 14 | 4 | 4 | Nagative | Clean | no finding |
|  | 5 | composition + tartrate buffer | 18 | 15 | 3 | 1 | Negative | Clear color clean | no finding |
| Lead sulfide - lead stearate Crude wool fat + soot Rhodamine B p-nitrophenylthiophosphoric acid ester (E 605 | 6 | water | 18 | 16 | 12 | 15 | Strong | Dirty | unpleasant |
|  | 7 | anionic tensid | 18 | 16 | 10 | 13 | Strong | Turbid, Cloudy | distinct |
|  | 8 | anionic nonionic combined | 18 | 15 | 10 | 11 | Average | Clean | distinct |
|  | 9 | As in No. 8 + EDTA | 18 | 16 | 7 | 3 | Weak | Clean | very faint |
|  | 10 | composition + tartrate buffer | 18 | 14 | 2 |  | Not found | Clear color Clean | very faint |

Table V

Comparative purification tests on the surface of grapes exposed for several days to contamination by lead:

| Purification Agent | Location I mg lead/kg fruit before treatment / after | Appearance, afterward | Location II mg lead/kg fruit before treatment / after |
|---|---|---|---|
| water | 3.7 / 1.4 | visibly coated | 2.4 / 2.3 |
| anionic/nonionic tensides + EDTA | 3.7 / 0.5 | clear glossy | 2.2 / 2.0 |
| agent as per invention | 3.6 / 0.2 | clear glossy | 2.4 / 0.8 |

Table VI

Purification test on fresh grass feed:

| Artificial soiling | Purification agent | mg. lead content/kg fruit before treatment / after |
|---|---|---|
| none | water | 2.8 / 0.8 |
|  | agent as per invention | 2.8 / <0.2 |
| colloidal lead oxide + model soiling | agent as per invention | 12.0 / <0.2 |

Although the invention has been described with respect to specific details of certain embodiments thereof, it is not intended that the details act as limitations upon the scope of the invention except insofar as set forth in the accompanying claims.

We claim:

1. A non-toxic and hypotonic composition to be added to washwater to eliminate contaminants and pollutants from the surfaces of foods and fodder, and for freshening the latter, consisting essentially of at least one substance from each of the groups given below in the following compositions:
   a. 1 to 10% by weight anionic tensides, selected from the group consisting of sulfates, ether sulfates, sulfonates, sulfoacetates, sulfosuccinates, sarcosinates, and protein condensation products;
   b. 0.1 to 4% by weight nonionic tensides, selected from the group consisting of polyoxyethylene adducts;
   c. 1 to 25% by weight sequestering agent;
   d. 1 to 4% by weight of reductones;
   e. 5 to 30% by weight buffers;
   f. 0.1 to 0.5% by weight preservatives;
   g. remainder up to 100% by weight of stabilizers, processing additives, extenders and diluents.

2. A composition according to claim 1, containing olefin sulfonate as an anionic tenside.

3. A composition according to claim 1, containing sulfosuccinic acid semiester from ethoxylated and non-ethoxylated fatty alcohols as an anionic tenside.

4. A composition according to claim 1, containing lauryl sulfate and/or lauryl ether sulfate as an anionic tenside.

5. A composition according to claim 1, containing polyoxyethylene sorbitan fatty acid ester as an nonionic tenside.

6. A composition according to claim 1, containing fatty alcohol polyglycol ether as a nonionic tenside.

7. A composition according to claim 1, containing ethylenediaminetetraacetic acid and/or its salts as a sequestering agent.

8. A composition according to claim 1, containing at least one member of the group consisting of tartaric acid, citric acid, and gluconic acid.

9. A composition according to claim 1, which contains a d-sorbitol.

10. A composition according to claim 1, containing at least one hydroxycarbonic acid and their alkali salts.

11. A composition according to claim 1, containing lactic acid and/or p-hydroxybenzoic acid ester.

12. A composition according to claim 1, containing cold-soluble plant and animal gums, cellulose and starch derivatives, or other water-soluble colloids as stabilizers.

13. A composition according to claim 1, which is prepared anhydrously and stabilized by adding anhydrous sodium sulfate.

14. A composition according to claim 13, which is made flowable by adding colloidal silicic acid.

15. A composition according to claim 1, which is kept at a pH value between 5 and 8, in concentrated and dilute aqueous solution by buffers.

16. A composition according to claim 1, which is kept reductive in a concentrated or dilute aqueous solution by a reductone selected from the group consisting of sulfurous acid and salts thereof, ascorbic acid and ascorbates.

17. A composition according to claim 1, which is available in solid discrete form.

18. A composition according to claim 1, in the form of a paste or gel.

19. A composition according to claim 1, in the form of an aqueous concentrate.

20. A composition according to claim 1, which is contained in a fabric.

21. A composition according to claim 1 consisting essentially of the following in parts by weight: ascorbic acid (20), ethylenediaminetetracetic acid, disodium salt (20), citric acid (15), D-sorbitol (120), colloidal silicic acid (6), lauryl sulfate (25), sodium disulfite (9), citric acid, trisodium salt dihydrate (60), polyoxyethylene sorbitan fatty acid ester (5), potassium chloride (720).

22. A composition according to claim 1, consisting essentially of the following in parts by weight: ascorbic acid (40), ethylene diaminetetraacetic acid, disodium salt (30), citric acid (20), D-sorbitol (140), colloidal, silicic acid (7), lauryl sulfate (50), sodium disulfite (5), citric acid, trisodium salt dihydrate (100), polyoxyethylene sorbitan fatty acid ester (10), potassium chloride (600).

23. A composition according to claim 1, consisting essentially of the following in parts by weight: calcium ascorbate (10), citric acid (50), mannitol (50), colloidal silicic acid (7), olefin sulfonate salt (40), sodium disulfite (15), citric acid trisodium salt dihydrate (200), polyoxyethylene sorbitan fatty acid ester (20), D-sorbitol (100) sodium chloride (508).

24. A method for eliminating contaminants and pollutants from the surfaces of foods and fodder and for freshening the latter in which a composition according to claim 1 is employed in an undiluted or dilute aqueous solution on the surfaces of the foods or fodder and then rinsed off.

25. A method for eliminating contaminants and pollutants from the surfaces of foods and fodder and for freshening the latter, which comprises adding to the washwater therefor, a composition according to claim 1.

26. A method according to claim 25 wherein the washwater containing the composition remains on the surface of the foods or fodder without removal by rinsing.

* * * * *